Aug. 11, 1931.  A. L. FREEDLANDER  1,818,798
PULLEY
Filed April 11, 1928
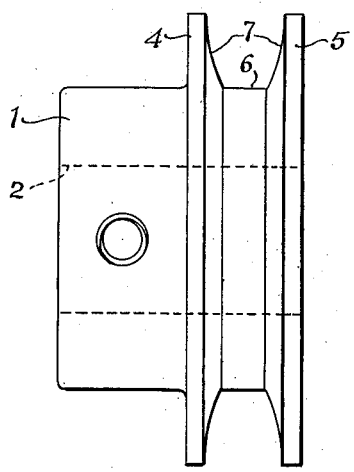
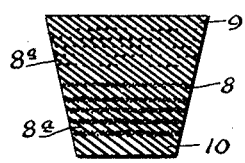
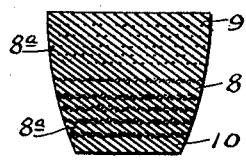
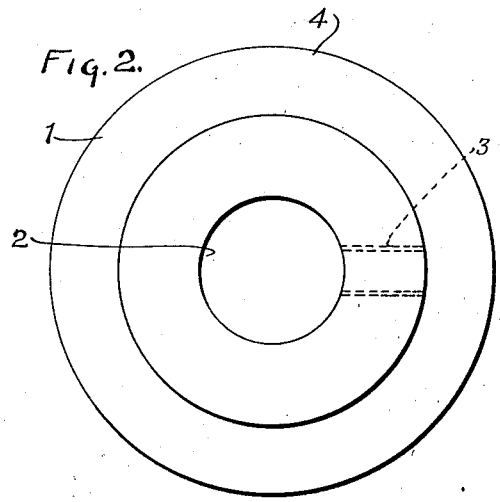
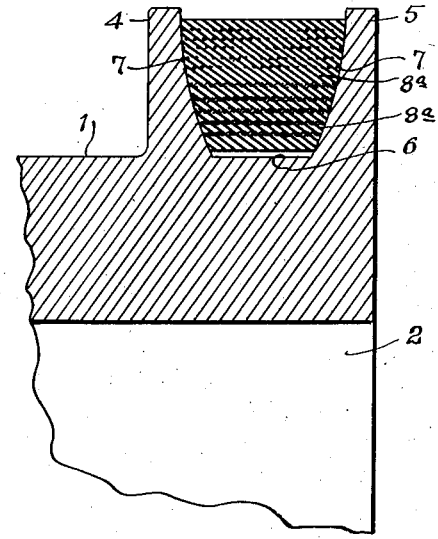
Inventor
ABRAHAM L. FREEDLANDER,
BY
Toulmin & Toulmin
Attorneys Patented Aug. 11, 1931

1,818,798

UNITED STATES PATENT OFFICE

ABRAHAM L. FREEDLANDER, OF DAYTON, OHIO

PULLEY

Application filed April 11, 1928. Serial No. 269,179.

It is the object of this invention to provide a pulley which would be used in connection with V-shaped belts, but in fact can be used with belts of any general circular form or shape.

It is especially the object of this invention to provide a pulley in which a minimum amount of material can be used, where there is small space and great strength, durability and pulling force. It is a special object of this invention to provide a pulley in which the surface contact between the pulley and the belt is maximum for the size of the pulley and the size of the belt.

These objects are effected by forming a pulley in which the belt seat is formed V-shape with the sides thereof concave and adapted to receive and cooperate with a belt of the general V-shape, or a belt in which the sides are more or less convex, being adapted to fit snugly and compactly within the belt seat.

The accompanying drawings illustrate one embodiment of this invention, and are used for the purpose of illustration.

In the drawings, Figure 1 illustrates a side view of the pulley, showing the form of the flanges and the resultant belt seat.

Figure 2 is an end view showing the orifice by which the pulley is adapted to be applied to shafts, or other bearing.

Figure 3 is a cross section of a belt particularly adapted to be used for this form of pulley.

Figure 4 is a cross section of a form of V-shaped belt.

Figure 5 is a cross section of the belt and the pulley assembled, showing the belt in close engagement with the pulley.

In the drawings, the numeral 1 illustrates or represents the pulley as a whole, which has extending therethrough the hole 2, through which a spindle or shaft or axle may pass, and upon which the pulley rotates. The numeral 3 illustrates a hole through which the pulley may be fastened to the shaft, or it may be used for any other purpose necessary.

Extending around the body of the pulley 2 is a flange 4, having one side thereof substantially perpendicular to the body of the pulley, and the other side more or less inclined to form somewhat of a concave circular surface.

At the end of the pulley and adjacent the flange 4 is the flange 5, having an outside thereof substantially perpendicular to the axis of the pulley and the inside surface 7 inclined to the axis and formed in concave manner, and forming with the concave part of the flange 4 concave cavities, indicated by the numeral 7, cooperating with each other to form the belt seat. The outer edges of the surfaces 7 are substantially perpendicular to the axis of the pulley but these surfaces approach each other as they reach the flat bottom 6 of the seat.

The lower part of the belt seat formed by the inside walls of the flanges is indicated by the numeral 6, and is of substantially the same diameter and circumference as the body of the pulley, but in this case forms no part of the pulling effect when engaged by the belt.

For the purpose of use with the pulley seat, as indicated by the numeral 7, there may be formed a belt of the general form in cross section of that illustrated in Figure 3. In this figure there is shown a cross section of a belt with the upper and lower faces parallel with each other, and the sides convex adapted to fit into and engage the concave sides of the pulley.

When a pulley of this general shape and structure is made, the sides fit each other without very much distortion of the belt, and for that reason a belt in this particular instance might be made of substantially homogeneous material, or it might be made as shown by Figures 3 and 4, of material made of layers of fabric, preferably with the edges exposed and known as a raw edge belt.

In Figures 3 and 4 the middle layer of the fabric, indicated by the numeral 8, is composed of material that is stiff, more or less rigid, and non-expansible and non-compressible, while the outer layers 9 and 10 are composed of material that is expansible, contractable and compressible.

The part of the belt indicated by the numeral 8 indicates the main body of the belt and gives very little longitudinally when it comes into engagement with the side of the pulley, while the parts 9 and 10 constitute the more pliable and yielding parts of the belt and are adapted to give when brought into contact with the pulley. Rubber 8ª is interposed between the fabric layers 8, 9 and 10.

These parts adjust themselves to the shape of the pulley, and thereby more readily effect a complete surface contact between the pulley face and the sides of the belt.

In case the form of belt illustrated in Figure 4 is used, it will assume, on application to the pulley seat, the general form illustrated in Figure 5. The upper and lower parts of the belt are compressed to engage firmly the side of the pulley groove and make a close contacting engagement with the pulley, thereby increasing the pulling effect of the belt upon the pulley and the area of frictional contact.

Of course, if that form of belt illustrated in Figure 3 is used, there is very little distortion in the shape of the belt, and each part of the belt contacts with the side of the pulley with substantially the same degree of pressure. But this pressure increases with the pull on the belt, tending to wedge it down into the seat of the pulley. But it is intended at no time that the belt shall engage the lower surface of the pulley groove, but that all friction and pull shall be upon the side of the belt engaging the concave side of the pulley.

I desire to comprehend within my invention such modifications as may be clearly embraced within the claims and the scope of my invention.

Having thus fully described my invention, what I claim is new and desire to secure by Letters Patent, is:

1. In combination, a V type longitudinally inextensible transversely deformable straight wall belt of vulcanized rubber and fabric, and a grooved pulley having concavely curved sides adapted to receive and support said belt so that the side walls of the belt conform to the cross section of the groove of the pulley.

2. In combination, a combined V type belt of fabric and rubber vulcanized into a straight wall belt of trapezoid section laterally deformable and transversely flexible, and a groove pulley having concavely curved sides for receiving and deforming said belt, the fabric of said belt being bendable along any transverse axis of said belt.

3. In combination, a combined V type belt of fabric and rubber vulcanized into a straight wall belt of trapezoid section laterally deformable and transversely flexible, and a groove pulley having concavely curved sides for receiving and deforming said belt, the fabric of said belt being bendable along any transverse axis of said belt, said belt being so arranged that the raw edges of fabric extending to deformable sides thereof will engage with the curved side walls of the pulley for driving purposes.

In testimony whereof, I affix my signature.

ABRAHAM L. FREEDLANDER.